United States Patent [19]

Farrington

[11] Patent Number: 5,014,082

[45] Date of Patent: May 7, 1991

[54] METHOD AND APPARATUS FOR COMPENSATING FOR SHUTTER SPEED VARIATIONS

[75] Inventor: David L. Farrington, Boxborough, Mass.

[73] Assignee: Polaroid Corporation, Cambridge, Mass.

[21] Appl. No.: 445,443

[22] Filed: Dec. 4, 1989

[51] Int. Cl.⁵ .............................................. G03B 7/08
[52] U.S. Cl. ..................................... 354/437; 354/439
[58] Field of Search ................ 354/435, 436, 437, 439

[56] References Cited

U.S. PATENT DOCUMENTS

| | | |
|---|---|---|
| 3,415,644 | 12/1968 | Land . |
| 3,753,392 | 8/1973 | Land . |
| 3,942,183 | 3/1976 | Whiteside ............................. 354/29 |
| 4,009,866 | 3/1977 | Iwata et al. .......................... 354/439 |
| 4,053,907 | 10/1977 | Iwata et al. .......................... 354/437 |
| 4,325,614 | 4/1982 | Grimes ................................. 354/437 |
| 4,354,748 | 10/1982 | Grimes et al. ....................... 354/437 |
| 4,360,258 | 11/1982 | Hashimoto ........................... 354/435 |
| 4,427,276 | 1/1984 | Feinerman et al. ................. 354/413 |
| 4,445,762 | 5/1984 | Boccuti ................................ 354/437 |
| 4,716,432 | 12/1987 | Stephany ............................. 354/446 |
| 4,751,543 | 6/1988 | Kodaira et al. ..................... 354/435 |
| 4,835,564 | 5/1989 | Nakagawa et al. ................. 354/435 |

Primary Examiner—Russell E. Adams
Attorney, Agent, or Firm—John J. Kelleher

[57] ABSTRACT

An exposure control system for a photographic camera employing a scanning type shutter that includes a pair of cooperating shutter blade elements automatically compensates for exposure altering variations in shutter blade element speed that may occur from one exposure interval to another. The exposure control system incudes an encoder to provide information on the actual position of the shutter blade elements as a function of time during an exposure cycle. The encoder generates a series of pulses representative of relative blade element position as the blades are moved during the exposure cycle. The time between these pulses is measured and directly converted into a signal representative of shutter blade element speed or velocity. This shutter blade speed signal is then employed to alter the duration of an exposure interval to compensate for any shutter blade element speed variations.

9 Claims, 3 Drawing Sheets

METHOD AND APPARATUS FOR COMPENSATING FOR SHUTTER SPEED VARIATIONS

BACKGROUND OF THE INVENTION

1. Field of the Invention

The present invention relates to an exposure control system for photographic apparatus, in general, and to a method and appartus for compensating an exposure for variations in the response time of a shutter blade mechanism in such apparatus, in particular.

2. Description of the Prior Art

One well-known exposure control mechanism for a photographic camera is a so-called scanning blade shutter comprising two cooperatively moving shutter blade elements connected for opposed reciprocating movement with respect to each other. The shutter blade elements are formed with selectively shaped aperture openings which, depending upon the positions of the blades, symmetrically overlap over a light entry exposure opening within the camera housing. The blade elements are connected to define a progression of apertures over the light entry opening in the camera as a result of their connection with a so-called "walking beam" which is rotatably mounted with respect to the camera housing. When the "walking beam" is actuated by a combination spring and electrical solenoid coupled thereto, the shutter blade elements move simultaneously and in correspondence with each other to define a symmetrically configured and variable aperture opening over the camera light entry exposure opening.

Means are provided for automatically controlling the shutter blade elements to produce an exposure interval. They include the above-mentioned electrical solenoid and spring combination for actuating the shutter blade elements and, more particularly, the apertures formed therein, between opened and closed positions. In addition, means are provided for detecting and intergrating scene light in correspondence with scene light admitted by the apertures in the blade elements to the film plan during an exposure interval.

In a scanning blade exposure control system of the type described above, a force generated by the spring activates the shutter blade elements to produce a particular scene light admitting aperture size as determined, in part, by the above-mentioned scene light detecting and integrating means. When the required amount of scene light has been detected and integrated, a signal responsive thereto causes the electrical solenoid, which is coupled to each shutter blade element, to reverse shutter blade movement and reduce the particular light admitting aperture mentioned above, to zero. In order to produce the correct exposure, the light admitting aperture should theoretically reduce the particular aperture to zero as soon as it is commanded to do so. For any number of reasons this type of response will not occur without some additional control being provided.

One reason that a particular exposure aperture might grow larger than commanded by the exposure control system may be due to the unpredictable variations in the forces provided by the electrical solenoid and/or the spring that actuates the shutter blade elements between their opened and closed positions. Due to manufacturing tolerances, it is difficult to consistently produce a spring that will impart the same opening force to a pair of shutter blade elements. The force generated by one spring may be substantially greater or less than that generated by another such spring thereby causing the shutter blade elements to open at a faster or slower rate than another similarly actuated set of shutter blade elements. This variation in the speed of shutter blade elements movement can produce a substantially over or under exposed photographic image.

The same sort of shutter blade element speed variation can result from manufacturing tolerances between different electrical solenoids employed to actuate a pair of shutter blade elements to their fully closed positions. In the manufacturing process it is difficult to consistently wind a large number of solenoid coils having the same force-generating characteristics. Also, these solenoid coils are normally powered by a conventional battery whose output power is progressively reduced over its useful life. This reduction in power will reduce the force imparted to the shutter blade elements which will also produce an exposure affecting change in shutter blade element speed.

Factors such as friction between adjacent shutter blade elements and other movable members coupled thereto can also produce a variation in shutter blade element speed. Means for compensating for these factors have been disclosed in several forms such as the anticipation built into the photometer apertures found in some shutter blade elements through which the photometer senses scene light for the control of shutter blade elements movement. A problem with this and many other such solutions is that they are all incorrectly based on the assumption that the speed of the shutter blade elements remains constant from one exposure interval to the next. This assumption breaks down in practice due to the above-noted manufacturing tolerances in the shutter components and variations in friction due to change in the orientation of the camera by a camera operator during a normal series of picture taking operations.

SUMMARY OF THE INVENTION

It is a primary object of the present invention, therefore, to provide an exposure control system for a photographic camera that will compensate for variations in the response time of a shutter mechanism that may occur from one exposure interval to another.

It is another object of the present invention to provide an exposure control system for a photographic camera that will compensate for any changes in the speed of the shutter blade elements forming a portion of the exposure control system caused by changes in mechanical friction.

It is a further object of the present invention to provide an exposure control system for a photographic camera that will compensate for any changes in the speed of the shutter blade elements forming a portion of the exposure control system caused by a progressive reduction in the magnitude of the battery power supplied to the control system by a conventional battery that may occur during extended battery usage.

Other objects, features and/or advantages of the present invention will be readily apparent from the following detailed description of a preferred embodiment thereof when taken in conjuction with the accompanying drawings.

In accordance with a preferred embodiment of the present invention an exposure control system for a photographic camera employing a scanning type shutter that includes a pair of cooperating shutter blade elements is provided with means for compensating for exposure altering variations in the response time of a shutter blade mechanism that may occur from one exposure interval to another. The compensating means includes a blade position encoder that generates a series of pulses representative of relative blade element positions as the blade elements are moved during an exposure cycle. The time between these pulses is measured and directly converted into a signal representative of shutter blade speed. This shutter blade elements speed signal is then employed to alter the duration of a subsequent exposure interval and thereby compensate for any variations in the response time of the shutter blade mechanism.

DETAILED DESCRIPTION OF THE PREFERRED EMBODIMENT

Figure 1:
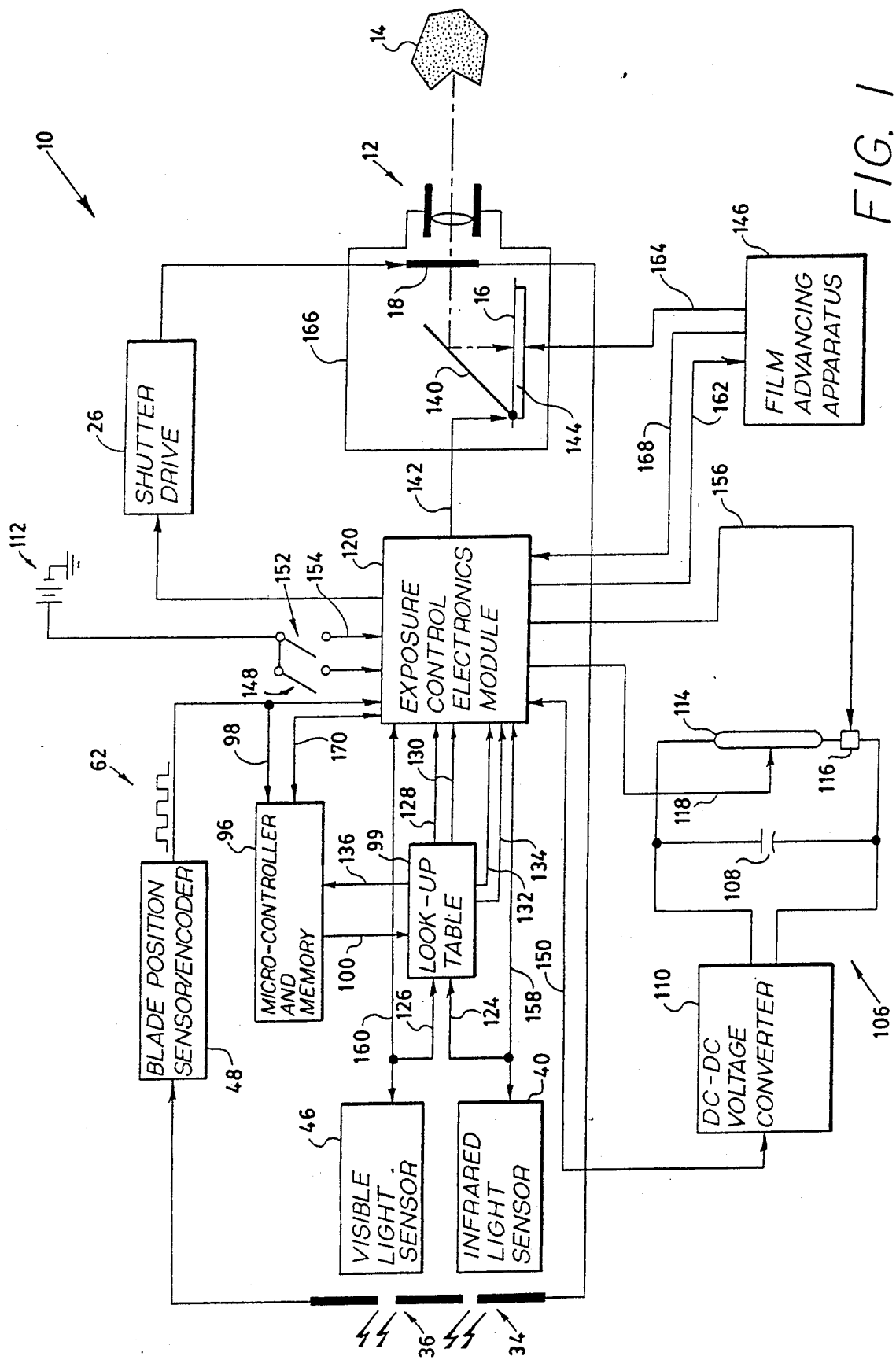
FIG. 1 is a schematic diagram of a photographic camera which incorporates a preferred embodiment of the exposure control system of the present invention that compensates for variations in the response time of a shutter blade mechanism.

Referring now to the drawings, and specifically to FIG. 1, there is shown a single lens reflex (SLR) photographic camera 10 of the self-developing type which incorporates a preferred embodiment of an exposure control system that compensates for exposure altering shutter blade speed variations during each exposure cycle. The camera 10 includes an objective or taking lens 12, of the fixed focus type, that may include one or more elements (only one shown) for focusing image-carrying light rays of, for example, an object 14 on a film plane 16 through an aperture formed in a shutter blade mechanism or assembly 18.

Figure 2:
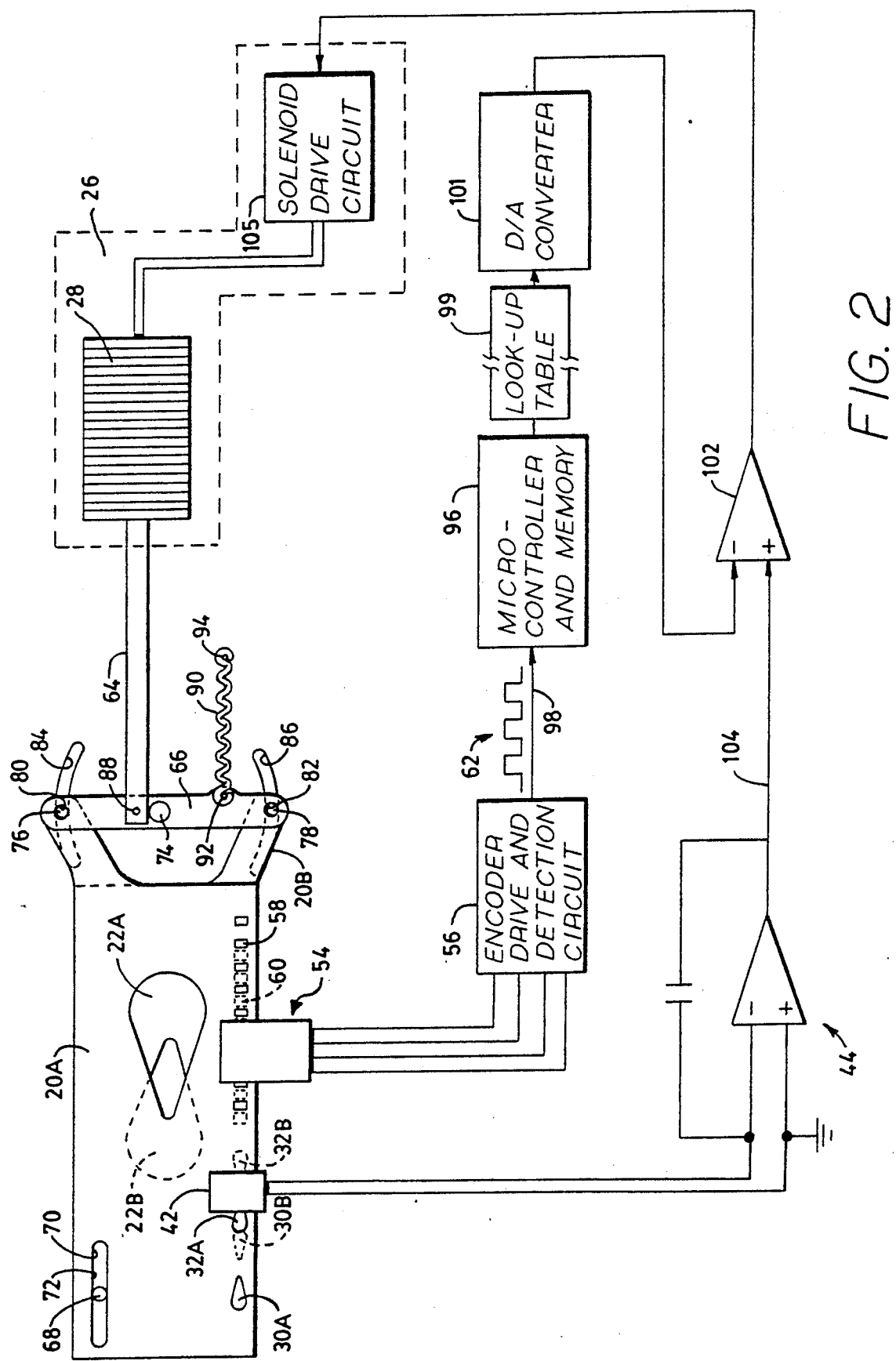
FIG. 2 is a schematic diagram of a portion of the exposure control system of FIG. 1 showing the shutter blade element speed sensing and compensating means of the present invention in greater detail.
Figure 3A:
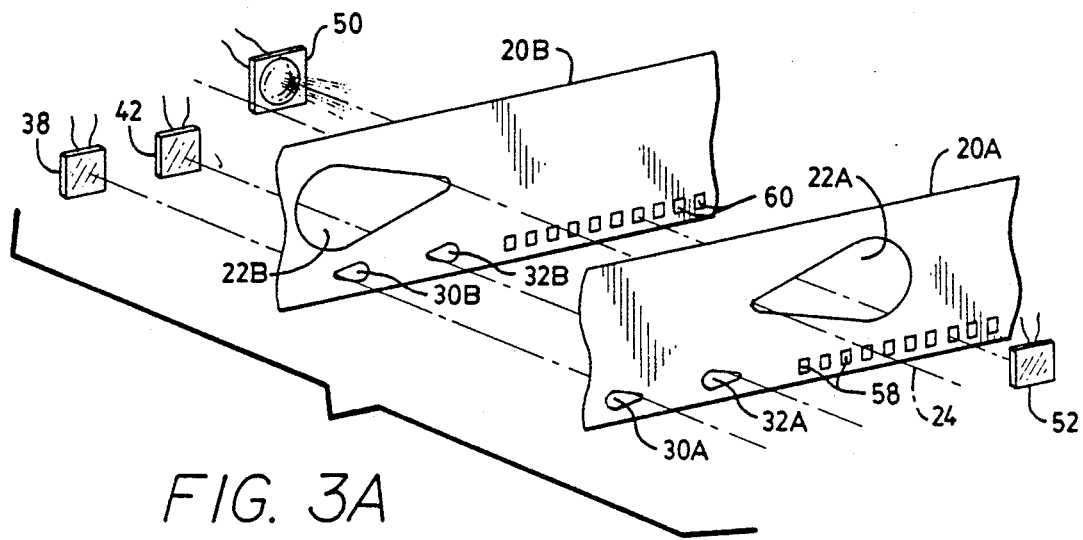
FIG. 3A is an exploded perspective view of the scanning type shutter mechanism shown in FIG. 2.
Figure 3B:
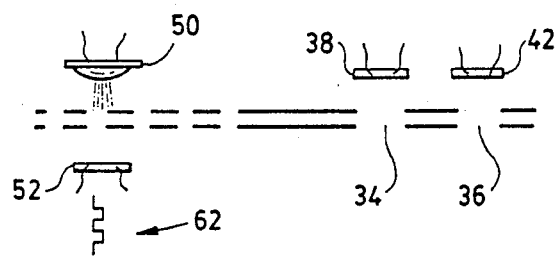
FIG. 3B is an unexploded top view, partly in sections, of the shutter blade mechanism of FIG. 3A.
Figure 4:
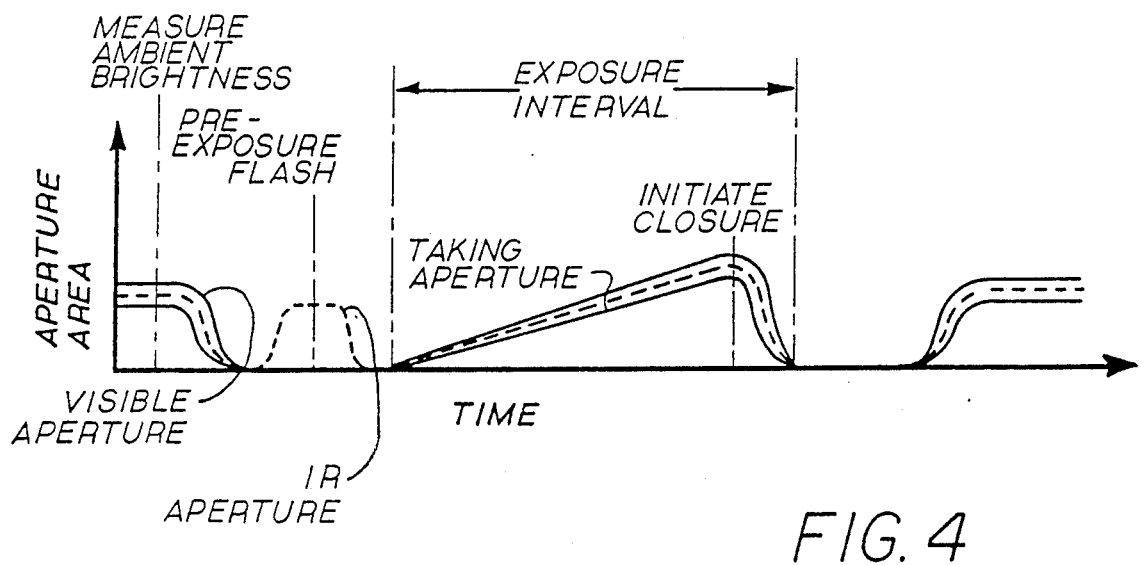
FIG. 4 is a graph showing primary and secondary blade aperture size variations as a function of time, during an exposure cycle.

With additional reference to FIGS. 2, 3A and 3B of the drawings, the shutter blade mechanism 18, positioned intermediate of the lens 12 and the film plane 16, includes a pair of overlapping shutter blade elements 20A and 20B of the "scanning" type. Scene light admitting primary apertures 22A and 22B are respectively provided in the blade elements 20A and 20B to cooperatively define a progressive and predictable variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures 22A and 22B are selectively shaped so as to overlap the central optical axis 24 of the lens 12 thereby defining a gradually varying effective aperture size as a function of the position of the blade elements 20A and 20B of the blade mechanism 18. A shutter drive 26 is provided for displacing the blade elements 20A and 20B of the blade mechanism 18 in the above-described manner. The shutter drive 26 includes a tractive electromagnetic device in the form of a plunger-type solenoid 28 and a control system therefor for displacing the above-mentioned shutter blade elements. The solenoid 28 and its associated control system will be described below in detail.

Each of the blade elements 20A and 20B of the blade mechanism 18 includes two secondary apertures 30A, 32A and 30B, 32B, respectively. The aperture 30A in the blade 20A cooperates with the aperture 30B in the blade 20B to form an opening 34 and the aperture 32A in blade 20A cooperates with the aperture 32B in the blade 20B to form an opening 36 through the shutter assembly 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apetures when the blade elements 20A and 20B are displaced, in the above-described manner, with respect to one another. The amount of artificial light admitted to the film plane 16 through the primary apertures is controlled by a signal generated by a combination infrared photosensitive element 38 and integrator (not shown) within an infrared sensor 40 that senses and integrates a corresponding amount of infrared scene light through the opening 34. The amount of visible light admitted to the film plane 16 through these primary apertures is controlled by a signal generated by a combination visible light photodiode 42 and an integrator 44 within a visible light sensor 46 that senses and integrates a corresponding amount of ambient light, through the opening 36. An example of scanning blade elements having primary and secondary apertures that cooperate to control the amount of scene light admitted to a film plane is shown in U.S. Pat. No. 3,942,183, to Whiteside.

The camera 10 is provided with a blade position sensor/encoder 48. The sensor/encoder 48 senses the position of the blade elements 20A and 20B with respect to one another and generates a signal representative of the relative blade element position. As shown in FIGS. 3A and 3B, the sensor/encoder 48 comprises a light emitting diode 50 and a photosensor 52 spaced therefrom formed as a single assembly 54 (FIG. 2), an encoder drive and detection circuit 56 connected thereto and a plurality of slots or openings 58 and 60 formed in the blade elements 20A and 20B, respectively. The slots 58 and 60 are rectangular in shape, are of uniform size and are equally spaced in a linear direction in their respective blade elements. The slots 58 and 60 are collectively interposed between the light emitting diode 50 and the photosensor 52 such that they alternately block and unblock the transmission of light between these two components to thereby cause the encoder drive and detection circuit 56 connected thereto to generate one or more pulses 62 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulses 62 is also a measure of the size of the effective or taking aperture formed by the primary apertures 22A and 22B. The size of the blade encoder slots 58 and 60 in respective blade elements 20A and 20B is kept to a minimum, in the direction of blade element movement, in order to minimize any shutter blade position errors between their actual position and the signal or pulses 62 representative of such position.

FIG. 2 shows the plunger-type solenoid 28 with its movable plunger 64 mechanically coupled to the blade elements 20A and 20B through a walking beam 66. Projecting from a camera support member or casting (not shown) at a location laterally spaced from the opening formed by the primary apertures 22A and 22B is a pivot pin or stud 68 which pivotally and translatively engages elongated slots 70 and 72 formed in shutter blade elements 20A and 20B, respectively. The opposite ends of the blade elements 20A and 20B respectively include extended portions which pivotally connect to the walking beam 66. The walking beam 66, in turn, is disposed for rotation about a pivot pin or stud 74 that is supported by a camera support member (not shown) at a location that is also laterally displaced form the opening formed by the primary apertures 22A and 22B. The walking beam 66 is pivotally connected at its distal ends to the shutter blade elements 20A and 20B by respective pin members 76 and 78 which extend from the walking beam 66. Pin members 76 and 78 are preferably circular in cross section and extend through respective circular openings 80 and 82 in respective blade members 20A and 20B so as to slidably engage respective arcuate slots or tracks 84 and 86 formed in a housing support member (not shown). The arcuate tracks operate to prohibit disengagement of the blade members 20A and 20B from their respective pin members 76 and 78 during an exposure cycle.

A tractive electromagnetic device in the form of the solenoid 28 is employed to displace the shutter blade elements 20A and 20B with respect to each other to produce an exposure interval. The solenoid 28 is of conventional design having an internally disposed cylindrical plunger 64 which retracts inwardly into the body of the solenoid upon energization thereof. The solenoid plunger 64 is affixed to the walking beam 66 by means of a pivot pin or stud 88 such that the longitudinal displacement of the plunger 64 will operate to rotate the walking beam 66 around the pivot pin 74 so as to appropriately displace the blade elements 20A and 20B.

The solenoid 28 is supported, in a fixed position, above a bias tensioning spring 90, which operates to continuously urge the blade elements 20A and 20B into positions collectively defining their largest effective aperture, overlapping the central optical axis 24 of the lens 12.

A movable end of the spring 90 is attached to the walking beam 66 by a pin 92 projecting therefrom, while a stationary end is affixed to a pin 94 extending from a camera housing support member (not shown). With this particular spring connection the blade members 20A and 20B and the primary apertures 22A and 22B respectively formed therein are biased to their normally open orientation. The blade elements 20A and 20B are actuated to their closed position only when the solenoid is energized. Consequently, energization of the solenoid 28 prevents the shutter blade elements 20A and 20B from moving toward their maximum aperture opening under the urging of the bias spring 90.

As mentioned above, the exposure control system of the present invention is provided with means for compensating for exposure altering variations in shutter blade element speed that may occur from one exposure interval to another. This compensating means will now be described in detail. With continued reference to FIG. 1 and 2 of the drawings, as explained above, the camera 10 is provided with a blade position sensor/encoder 48 that senses the position of the blade elements 20A and 20B with respect to one another and generates a signal 62 representative of relative blade element position. The signal 62 is in the form of a series of pulses that are routed to a microcontroller and memory 96 through a path 98. The time between adjacent pulses in the series of pulse is a measure of blade element speed or momentum. This time is preferably measured between the leading edges of these adjacent pulses.

Knowing the speed of the shutter blade elements and how the size of the taking aperture collectively formed by the overlapping primary apertures 22A and 22B and respectively formed in the shutter blade elements 20A and 20 B changes over time, the size of the taking aperture at any time during an exposure interval can be readily determined. In addition, and as previously explained, when energized, the plunger-type solenoid actuates the shutter blade elements 20A and 20B and the taking aperture formed thereby to its fully closed position against the bias of the spring 90. The exposure control system sends a signal or shutter blade close command to the solenoid 28 when exposure is complete. However, due to normal system inertia, there is an inherent delay between the time that the solenoid 28 and the shutter blade elements coupled thereto respond and actually start to close the taking aperture at the end of an exposure. This phenomenon is sometimes referred to as blade element overshoot. In addition, the time it takes to close a taking aperture after it is commanded to do so is also dependent upon shutter blade speed. The slower the response time of the solenoid and shutter blade mechanism combination and/or the faster the blade speed, the greater will be the degree of blade element overshoot. If this blade element overshoot is not sufficiently compensated for, an overexposed photographic image may result.

The microcontroller and memory 96 is coupled to an empirically constructed look-up table 99 through a path 100 which is responsive to a shutter blade speed signal derived by a conventional timing circuit within the microcontroller and memory 96, from the shutter blade relative position signal 62. The speed of shutter blade movement is determined by the timing circuit by measuring the amount of time consumed between the leading edge of adjacent blade element position pulse 62. The look-up table 99 generates a sutter blade speed dependent output reference signal representative of a percentage of the total size of the exposure or taking aperture required to produce a properly exposed photographic image. The magnitude of this percentage of total aperture size signal generated by the look-up table 99 is dependent, in part, upon a predetermined empirical assessment or determination of how long it takes the exposure control system to close the taking aperture formed by the shutter blade elements 20A and 20B for any particular speed of shutter blade element movement, once a command to do so is initiated.

If, for example, it had been determined that twenty percent of an exposure is produced during an exposure interval after a command is initiated by the exposure control system to close the taking aperture, the shutter blade speed dependent look-up table 99 would generate a shutter blade close command reference signal that is equal to eighty percent of the required exposure. The remaining twenty percent of the required exposure would result from the above-described initial delay in shutter blade element movement and the speed at which the shutter blades move when actuated to their closed positions.

The percentage of exposure reference signal is in a digital format and is therefore applied to a digital-to-analog converter 101 whose output is applied to one input of a comparator 102. During an exposure interval the visible light photodiode 42 senses ambient scene light through the secondary apertures 32A and 32B and generates an electrical signal representative of scene light intensity. This scene light intensity signal is then applied to and is intergrated, as a function of time, by the intergrator 44. The output of the intergrator 44 is, in turn, applied to another input of the comparator 102 through a path 104. When the magnitude of the integrated ambient scene light signal equals the percentage of exposure reference signal being applied to the comparator 102 by the digital-to analog converter 101, the comparator 102 transmits an end of exposure signal to a solenoid drive circuit 105 within the shutter drive 26 threreby causing the solenoid 28 to actuate the shutter blade elements 20A and 20B to their fully closed positions. The end of the exposure interval is controlled by a combination of this percentage of exposure reference signal and the above-described initial delay in shutter blade movement and the speed at which the shutter blade elements move when actuated to their closed positions.

The camera 10 is also provided with an electronic flash apparatus 106 together with apparatus for controlling its energization in order to determine subject reflectivity and to provide a portion of the exposure value required to illuminate a scene to be photographed. The electronic flash apparatus 106 comprises a main storage capacitor 108 which may be charged up to an operating voltage by any conventional voltage converter circuit (not shown) which would be included within a DC-DC voltage converter 110. The DC-DC voltage converter 110 operates in a conventional matter to convert a DC voltage as may be derived from the battery 112, which can be in the order of 6 volts, to a suitable operating voltage such as 280 volts. A flash tube 114 and a thyristor 116 are connected in a series relation and they are, in turn, collectively connected in a parallel relation with respect to the main storage capacitor 108. The flash tube 114 may be energized by a suitable trigger signal on a path 118 from a conventional trigger circuit (not shown) within an exposure control electronics module 120. When energized, the flash tube 114 illuminates the scene and subjects included therein with both visible and infrared light.

The look-up table 99 also generates additional empirically derived exposure control signals. The primary purpose of these signals is to control the amount of image-carrying scene light rays focused on the film plane 16 by the lens 12 through the effective or taking aperture in the blade mechanism 18 formed by the primary apertures 22A and 22B, as a function of ambient scene light and of subject reflectivity.

As previously explained, the amount of artificial and ambient scene light transmitted to the film plane 16 is indirectly measured by sensing a portion of the artificial and ambient or visible scene light through the openings 34 and 36 in the blade mechanism 18 with photosensors 38 and 42 and their associated integrators located within the infrared light sensor 40 and the visible light sensor 46, respectively. A signal generated by the infrared sensor 40 and its associated integrator representative of reflected infrared scene light is routed to the look-up table 99 through a path 124 and a signal generated by the visible light sensor 46 and its associated integrator 44 representative of ambient scene light is routed to the look-up table 99 through a path 126. The look-up table 99 generates a plurality of different signals in response to these two signals and in response to the above-mentioned percentage of exposure aperture size reference signal, for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 99 are (1) an aperture size signal that controls the size of the taking aperture formed by the primary apertures 22A and 22B at which the flash tube 114 is fired, on an output path 128; (2) a percentage of artificial light signal that controls the amount of artificial light to be added to the scene to be photographed by the flash tube 114, on an output path 130; (3) a percentage of exposure aperture size refernce signal that controls the amount of image-carrying light to be admitted to the film plane 16 through the primary apertures 22A and 22B in the blade mechanism 18, on an output path 132; and (4) a signal to terminate the exposure interval at a time dependent upon the magnitude of the artificial and ambient light signals appearing on the input paths 124 and 126, respectively, to the look-up table 99, if the exposure interval is not sooner terminated, on an output path 134.

Prior to the generation of the above-noted look-up table output signals on the paths 128, 130, 132 and 134, the ambient light signal generated by the visible light sensor 46 is routed to the microcontroller 96, through the look-up table 99 and a path 136, for temporary storage. Subsequent to the storage of this ambient light signal in the microcontroller 96 and prior to the start of an exposure interval, the artificial light reflected from a scene subject previously illuminated by a wink or short duration flash of light from the flash tube 114 is sensed by the infrared sensor 40 and a signal representative thereof is routed to the look-up table 99 through the path 124. The ambient light signal stored within the microcontroller 96 is then routed to the look-up table 99 through the path 100. The stored ambient light signal, the infrared signal generated by the sensor 40 and the percentage of exposure aperture size reference signal are collectively employed within the look-up table 99 to generated the above-noted signals appearing on the output paths 128, 130, 132 and 134 of the look-up table 99. The signals appearing at the output paths 128, 130, 132 and 134 of the look-up table 99 in response to the artificial land ambient scene light signals respectively generated by the sensors 40 and 46 and the percentage of exposure aperture size reference signal are empirically determined. The look-up table 90 is constructed, in part, in accordance with the subjective analysis of a multiplicity of photographic images of subjects at various distances having a range of reflectivities that are formed under a wide range of artificial and ambient scene lighting conditions, in order to produce these signals.

In general, when forming a photographic image at the film plane 16 of the camera 10, the smaller the taking aperture formed by the primary apertures 22A and 22B, the greater will be the depth of field of the lens 12 and the darker will be the ambient scene exposure level because of the reduction in image-carrying scene light caused by the smaller taking aperture. The look-up table 99 is constructed such that it performs a tradeoff between the sharpness of a subject within the scene and the overall scene exposure. In performing this tradeoff, the look-up table 99 causes the flash tube 114 to fire at the smallest possible taking aperture, and therefore the greatest depth of field, that will provide the optimum sharpness of a subject within a scene and overall scene exposure. The look-up table 99 further improves the overall scene exposure in response to the artificial and ambient scene light level signals generated by the sensors 40 and 46 by controlling the amount of artificial light generated by the scene-illuminating flash tube 114 and by controlling the maximum size of the taking aperture formed by the primary apertures 22A and 22B.

As noted above, the camera 10 is of the SLR type and therefore includes a conventional reflex mirror 140 that is actuatable by the exposure control electonics module 120 through a path 142. The mirror 140 is actuable, in a conventional manner, between a viewing position where it blocks the transmission of scene light to the film plane 16 and where camera operator can view a scene to be photographed through the lens 12, and taking or unblocking position as shown in FIG. 1, where it reflects the scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. the self-developing film unit is packaged in a lighting film cassette 144 shown in the condition assumed just after the cassette 144 has been fully inserted into the camera 10. The cassette 144 may enclose the 6 VDC battery 112.

Mounted within the camera 10 is a film advancing apparatus 146 similar to that descried in U.S. Pat. No. 3,753,392 the Land that includes a motor for operating a gear train (neither shown) which is coupled with the film advancing apparatus 146 to provide for the continuous. movement of an exposed film unit from an exposure position within the camera 10 toward the exterior thereof. The film advancing apparatus 146 additonally includes a film-engaging arm member (not shown) driven by the above-mentioned motor and gear train. The arm member is adapted to extend into a slot in the cassette 144, as shown in the above-noted Land '392 patent, and engage the uppermost film unit located therein at or near its trailing edge prior to moving it out of the cassette 144 and into the bite of a pair of conventional processing rollers (not shown) mounted adjacent the leading edge of the above-mentioned uppermost film unit. The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container of processing liquid at the leading end of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. For the purpose of this description it is assumed that the taking aperture of the blade mechanism 18 is in its full open position, that the openings 34 and 36 formed by the secondary apertures in the blade mechanism 18 are also fully opened, that the mirror 140 is in its viewing or light blocking position, that the flash apparatus 106 has been energized by the prior closure of a switch 148 that coupled the battery 112 to the DC-DC voltage converter 110 through the exposure control electronics module 120 and a path 150 and that the main storage capacitor 108 is fully charged and is ready for the initiation of an exposure cycle. With reference to FIGS. 1, 2, 3A, 3B and 4 of the drawings, a switch 152 is actuated to its closed position by a camera operator to initiate the exposure cycle. The closure of the switch 152 couples the battery 112 to the exposure control electronics module 120 through a path 154. With the blade mechanism opening 36 formed by the secondary apertures 32A and 32B adjacent the visible light sensor 46 in its fully open position, the closure of the switch 152 causes the integrator 44 within the visible light sensor 46 to integrate ambient scene light for a fixed period of time and then send the integrated value to the look-up table 99 through the path 126 and then to the microcontroller 96 through the path 136 for temporary storage.

The exposure control electronics module 120 subsequently energizes the shutter drive 26 to actuate the blade mechanism 18 and therefore the taking aperture together with the opening 34 formed by the secondary apertures 30A and 30B and the opening 36 formed by the secondary apertures 32A and 32B to their fully closed positions. As the shutter blade elements 20A and 20B of the shutter mechanism 18 are so actuated to their fully closed position, the position sensor/encoder senses blade position and routes a signal representative of same to the microcontroller and memory 96. As explained above, this blade position signal is converted to a blade speed signal and this signal then converted to the above-mentioned percentage of exposure aperture size reference signal. This percentage of exposure aperture size reference signal is, in turn, applied to an input of the comparator 102 within the exposure control electronics module 120 through the digital-to-analog connector 101. Subsequent to closing the opening 34 and prior to the initiation of an exposure interval, the shutter drive 26 causes the opening 34 to increase in size toward its fully opened position. While the opening 34 is being actuated toward its fully opened position, the exposure control electronics module 120 actuates means (not shown) for moving the mirror 140 from its viewing or light blocking position, where it precludes the transmission of image-carrying light rays to the film plane 16, to its light unblocking position (as shown in FIG. 1), where it facilitates the transmission of image-carrying light rays to the film plane 16 during an exposure interval. When the opening 34 adjacent the infrared light sensor 40 is in its fully opened position, the exposure control electronics module 120 triggers the flash tube 114 through the path 118 and thereby illuminates the scene to be photographed with visible and infrared light prior to the transmission of an exposure interval. The exposure control electronics module 120 then triggers the thyristor 116 through a path 156 thirty-five microseconds after triggering the flash tube 114 to thereby extinguish the light output of the flash tube 114. This thirty-five microsecond actuation of the flash tube 114 to illuminate the scene constitutes a first pulse of light directed toward the scene to be photographed.

In addition to the thirty-five microsecond actuation of the flash tube 114 to illuminate the scene prior to the initiations of an exposure interval, the exposure control electronics module 120 enables the integrator within the infrared sensor 40 through a path 158 during this same period of time and then causes the integrated value, which constitutes a measure of subject reflectivity, to be sent to the look-up table 99 through the path 124. Upon receipt of this subject reflectivity signal, the look-up table 99 combines it with the ambient light or scene brightness signal previously stored in the microcontroller 96. These combined signals and the percentage of exposure aperture size reference signal are then employed to generate the aperture size flash fire signal, the percentage of artificial light signal, the percentage of exposure aperture size reference signal and/or the end exposure signal subsequently appearing on the look-up table output paths 128, 130, 132 and 134, respectively, that are in turn, applied to the exposure control electronics module 120. Upon receipt of these look-up table generated signals, the exposure control electronics module 120 activates the shutter drive 26 and the blade mechanism 18 coupled thereto such that the opening 34 formed by the secondary apertures 30A and 30B is placed in its fully closed position and activates the shutter drive 26 and the blade mechanism 18 to initiate an exposure interval.

The exposure control electronics module 120 includes four conventional comparators (not shown) to determine when the four conditions represented by the look-up table output signals on the paths 128, 130, 132 and 134 and employed in the generation of an exposure interval have been achieved. An exposure interval is defined herein as the period of time that the shutter mechanism 18 allows image-carrying light rays collected by the lens 12 to reach the film plane 16.

The first of the above-mentioned comparators compares the reference or desired aperture size flash fire signal on look-up table output path 128 with the actual blade position signal and therefore the taking aperture size as represented by the pulses 62 from the blade position sensor/encoder 48. When this first comparator determines that these two signals are equal, the exposure control electronics module 120 once again triggers the flash tube 114 through the path 118 and thereby illuminates the scene being photographed with light containing both visible and infrared light during the exposure interval.

The second of the above-mentioned comparators compares the reference or desired percentage of artificial light signal on look-up table output path 130 with the actual level of artificial light illuminating the scene as sensed by the infrared light sensor 40 during the exposure interval and routed to the exposure control electronics module 120 through a path 158. When this second comparator determines that these two signals are equal, the exposure control electronics module 120 triggers the thyristor 116 through the path 150 to thereby extinquish the artificial light being generated by the flash tube 114. This illumination of the scene with artificial light constitutes a second pulse of light that is directed toward the scene to be photographed.

The third comparator is the comparator 102 that is also located within the exposure control electronics module 120. This comparator compares the above-mentioned shutter blade element, speed dependent, percentage of exposure aperture size reference signal on look-up table output path 132 with the amount of visible scene light that is sensed by the photodiode 42 and intergrated by the integrator 44 coupled thereto within the visible light sensor 46 that is routed to the exposure control electronics module 120 through a path 160. When the comparator 102 determines that these two signals are equal, the exposure control electronics module 120 actuates the shutter drive 26 and the solenoid 28 included therein, to close the taking aperture in the blade mechanism 18 and thereby terminate the exposure interval.

Under certain scene lighting and subject reflectivity conditions there may be insufficient ambient and/or artificial scene light reflected from the scene for sensor 40 and/or the visible light sensor 46 to generate a signal that is capable of causing the exposure control electronics module 120 to terminate an exposure interval in a reasonable amount of time. A fourth comparator arrangement is provided to overcome this problem. This fourth comparator compares a signal on the look-up table output path 134 representative of the level of ambient and/or artificial light reflected from the scene with a predetermined reference signal stored within the exposure control electronics module 120. If the signal on path 134 is greater than the reference signal, the exposure interval will be limited to a relatively short period of time such as 40 milliseconds and if it is less than the reference signal, the exposure interval will be limited to a relatively long period of time such as 400 milliseconds unless terminated sooner by the presence of greater levels of ambient and/or artificial scene light.

At the completion of the exposure interval, the exposure control electronics module 120 actuates the mirror 140 towards its light-blocking position, and actuates the film advancing apparatus 146 and the drive motor (not shown) included therein, through a path 162, to initiate the transport and processing of an exposed, self-developing film unit. The film advancing apparatus 146, in turn, moves the exposed film unit located in the cassette 144, through a path 164, into the bite of the pair of adjacent processing rollers (not shown), in the manner described above, to spread processing liquid between certain film layers and to move the exposed film unit into an exit slot (not shown) in a housing 166 of the self-developing camera 10. After the mirror 140 has been actuated to its light blocking position where it precludes the passage of light to the film plane 16, the exposure control electronics module 120 actuates the shutter drive 26 and the shutter mechanism 18 coupled thereto such that the primary or taking aperture thereof is placed in its fully opened position. After the film advancing apparatus 146 has moved the exposed film unit through the above-mentioned pair of rollers, a film movement completion signal is routed to the exposure control electronics module 120 and the microcontroller 96 coupled thereto through a path 168 and a path 170, respectively. Upon receipt of this film movement completion signal, the exposure control electronics module 120 initiates the charging of the electronic flash apparatus 106 through the path 150. When the main storage capacitor 108 of the electronic flash apparatus 106 is fully charged, as sensed through the path 150, the exposure control electronic module 120 places the exposure control system of the camera 10 in condition for the initiation of the next exposure cycle.

In the exposure control system described above, a source of artificial light generated by the flash tube 114 was employed to illuminate the scene with both visible and infrared light. The flash tube 114 illuminates the scene twice during an exposure cycle, once before and once during an exposure interval. Both the visible and infrared light were employed for exposure control during an exposure interval. However, only the infrared light from the flash tube 114 was employed for exposure control immediately prior to or at the early stages of the exposure interval. By firing the flash tube 114 twice and utilizing the infrared light portion of the illumination generated thereby in the determination of subject reflectivity before an exposure interval, only a single source of illumination is required. It should be noted, however, that exposure interval and pre-exposure interval illumination could be provided with two light sources. One source would be that provided by the flash tube 114 to generate both visible and infrared light and would be employed during the exposure interval. The other source would only have to emit infrared light prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed is:

1. A control system that compensates for variations in the response time of a blade mechanism in a photographic camera comprising:
   a blade mechanism comprising a pair of overlapping shutter blade elements with each shutter blade element having an aperture therein that cooperatively define an exposure aperture, said blade mechanism being mounted for movement between a blocking arrangement in which said blade mechanism is in light blocking relation with respect to an optical path so as to preclude scene light from being transmitted along the optical path to a film plane and an unblocking arrangement in which said blade mechanism is in light unblocking relation with respect to the optical path so as to allow the passage of scene light to the film plane through said exposure aperature when said blade mechanism is actuated between its said light blocking and unblocking arrangements to produce an exposure interval;
   means for sensing the relative speed of said shutter blade elements with respect to one another including changes in the magnitude of said relative speed and for generating a signal representative thereof;
   means responsive to said shutter blade elements relative speed signal for establishing a percentage of exposure aperture size reference signal representative of a predetermined percentage of the exposure aperture required to produce a particular photographic exposure;
   means for sensing ambient scene light during an exposure interval and for generating a signal representative thereof;
   means for integrating said ambient scene light signal and for generating a signal representative of the magnitude of the sensed ambient scene light at any particular time during said exposure interval;
   means for comparing said percentage of exposure aperture size reference signal with the integrated magnitude of said ambient scene light signal and for generating an end of exposure signal when said percentage of exposure aperture size reference signal and the instantaneous magnitude of the integrated ambient scene light signal are equal; and
   drive means connected to said blade mechanism for actuating said blade mechanism to initiate an exposure interval and responsive to said end of exposure signal for terminating said exposure interval.

2. The control system of claim 1 wherein said means for generating a signal representative of the relative shutter blade element speed comprises:
   an encoder for generating a series of time related pulses representative of the relative position of said shutter blade elements; and
   means responsive to the magnitude of the time interval between said time related pulses for generating a signal representative of the relative shutter blade element speed.

3. The control system of claim 2 wherein the magnitude of the time interval between said time related pulses is measured between the leading edges of adjacent pulses.

4. The control system of claim 2 wherein said encoder comprises:
   a light emitting device for providing a source of illumination;
   a light sensitive device for sensing the illumination provided by said light emitting device and for generating an electrical signal in response thereto;
   a linear array of uniformly spaced slots in each of said shutter blade elements in an opposed relation and interposed between said light emitting and said light sensitive devices whereby the actuation of said shutter elements between their opened and closed positions causes said shutter blade elements slots to alternately block and unblock the illumination sensed by said light sensitive device and thereby cause said light sensitive device to generate said electrical signal in the form of a series of pulses representative of relative shutter blade element position.

5. The control system of claim 2 wherein said means for generating said relative shutter blade element speed signal includes an electrical circuit for measuring the elapsed time between pulses in said series of pulses representative of relative shutter blade element position and for generating a signal responsive to the magnitude of said elasped time that is respresentative of said relative shutter blade element speed.

6. A single lens reflex camera comprising:
   means for defining a film plane;
   an optical system for directing image-carrying light rays along an optical path from a scene onto photosensitive material located in said film plane;
   a blade mechanism mounted for movement between a blocking arrangement in which said blade mechanism is in light blocking relation with respect to the optical path so as to preclude scene light from being transmitted along the optical path to said film plane and an unblocking arrangement in which said blade mechanism is in light unblocking relation with respect to the optical path so as to allow the passage of scene light to said film plane through an exposure aperture, said blade mechanism including a pair of overlapping shutter blade elements with each said shutter blade element having an aperture therein that cooperatively define an exposure aperture when said blade mechanism is actuated between its said light blocking and unblocking arrangements to produce an exposure interval;

means for sensing the relative speed of said shutter blade elements with respect to one another including changes in the magnitude of said relative speed and for generating a signal representative thereof;

means responsive to said shutter blade element relative speed signal for establishing a percentage of exposure aperture size reference signal representative of a predetermined percentage of the exposure aperture required to produce a particular photographic exposure;

means for sensing ambient scene light during an exposure interval and for generating a signal representative thereof;

means for integrating said ambient scene light signal and for generating a signal representative of the magnitude of the sensed ambient scene light at any particular time during said exposure interval;

means for comparing said percentage of exposure aperture reference signal with the integrated magnitude of said ambient scene light signal and for generating an end of exposure signal when said percentage of exposure aperture size reference signal and the instantaneous magnitude of the integrated ambient scene light signal are equal; and drive means for actuating said blade mechanism to initiate an exposure interval and responsive to said end of exposure signal for terminating said exposure interval.

7. A method of compensating for variations in the response time of a blade mechanism in a photographic camera comprising the steps of:

providing a blade mechanism having a pair of overlapping shutter blade elements with each shutter blade element having an aperture therein that cooperatively define an exposure aperture, the blade mechanism being mounted for movement between a blocking arrangement in which the blade mechanism is in light blocking relation with respect to an optical path so as to preclude scene light from being transmitted along the optical path to a film plane and an unblocking arrangement in which the blade mechanism is in light unblocking relation with respect to the optical path so as to allow the passage of scene light to the film plane through the exposure aperture when the blade mechanism is actuated between its light blocking and unblocking arrangements to produce an exposure interval;

sensing the relative speed of the shutter blade elements with respect to one another including changes in the magnitude of said relative speed and generating a signal representative thereof;

using the shutter blade element relative speed signal to establish a percentage of exposure aperture size reference signal representative of a predetermined percentage of the exposure aperture required to produce a particular desired exposure;

sensing the ambient scene light during an exposure interval and generating a signal representative thereof;

integrating the ambient scene light signal and generating a signal representative of the magnitude thereof for any particular time during the exposure interval;

comparing the percentage of exposure aperture size reference signal with the integrated magnitude of the ambient scene light signal and generating an end of exposure signal when the percentage of exposure aperture size reference signal and the instantaneous magnitude of the integrated ambient scene light signal are equal; and actuating the blade mechanism to initiate an exposure interval, and to subsequently terminate the exposure interval in response to the end of exposure signal.

8. The method of claim 7 wherein the step of sensing the relative speed of the shutter blade elements comprises:

providing an encoder for generating a series of time related pulses representative of the relative position of the shutter blade elements; and generating a signal representative of the relative shutter blade element speed that is responsive to the magnitude of the time interval between pulses in the series of time related pulses.

9. The method of claim 8 wherein the step of generating a signal representative of relative shutter blade element speed includes the step of generating a relative shutter blade element speed signal that is responsive to the magnitude of the time interval between adjacent time related pulses.

* * * * *